INVENTORS
Harold H. Detamore
Walter D. Eby
Craig V. Morton
Their Attorney

INVENTORS
Harold H. Detamore
Walter D. Eby
BY
Craig V. Morton
Their Attorney

United States Patent Office 2,768,612
Patented Oct. 30, 1956

2,768,612

MULTIPLE PISTON SERVO MOTOR

Harold H. Detamore and Walter D. Eby, Dayton, Ohio, assignors to General Motors Corporation, Detroit, Mich., a corporation of Delaware Application August 3, 1953, Serial No. 371,814

9 Claims. (Cl. 121—38)

The present invention pertains to actuators, and more particularly to a fluid pressure operated actuator.

Heretofore, power amplifying devices, such as actuators, have been employed to control the operation of valve mechanisms in a servo system. However, specialized actuators are required in servo systems for controlling the pitch position of propeller blades inasmuch as the several ranges of pitch positions must be accurately defined. Accordingly, among our objects are the provision of an actuator including means for defining a plurality of ranges of movement, and a further provision of an actuator including a plurality of reciprocable pistons operatively associated with a working piston for determining the stroke of the working piston.

The aforesaid and other objects are accomplished in the present invention by providing an actuator having a differential area working piston. Specifically, the actuator comprises a cylinder having disposed therein a first reciprocable piston with oppositely extending sleeve portions in sealing engagement with the cylinder walls. The cylinder wall is provided with four longitudinally spaced ports, three of which communicate with longitudinally spaced ports in the sleeves of the first piston. The sleeve piston is also formed with concentric annular flanges, or rod portions extending from both surfaces of the head portion, the piston head having a central opening. A second reciprocable piston is disposed for movement within one of the sleeves, the second piston having a longitudinally extending rod portion that is sealingly received within the central opening of the sleeve piston head. A working piston is mounted for reciprocable movement within the other sleeve portion of the sleeve piston. The working piston is formed with a cup-shaped head portion, the rim portion of which sealingly engages the sleeve piston, and the body of which is sealingly received by a guide constituting an end wall of the cylinder. The working piston also carries a stop member that is engageable with the rod portion of the second piston. The working piston further includes a rod portion, the end of which extends through the end wall of the cylinder and is provided with a toothed rack portion. The toothed rack portion meshes with a pinion having operative connection with an adjustable load member, such that upon reciprocation of the working piston, rotation will be imparted to the load member.

As the working piston is the only movable actuator element having operative connection with the load member, all adjustments of the load member must be transmitted through the working piston. By reason of the working piston having a cup-shaped head portion, it provides unequal piston head areas whereby reciprocable movement of the working piston may be accomplished by controlling the application and removal of pressure fluid from the cylinder chamber to which the larger area of the working piston head is exposed, the smaller piston head area being continuously exposed to pressure fluid of a predetermined potential. The second piston is capable of reciprocable movement by fluid under pressure in one direction, and capable of being moved in the other direction under the combined effects of fluid pressure and mechanical force. The sleeve piston is capable of combined mechanical and fluid pressure actuation in either direction. The sleeve piston can assume two positions, and the second, or stop, piston can assume three positions relative to the cylinder whereby three ranges of movement for the working piston are provided. The ranges of working piston movement correspond to blade angle positions of propeller blades in this instance, and the three ranges define a positive blade angle regime for the blades of an aircraft when the aircraft is in flight, a second positive blade angle regime for the blades when the aircraft is on a landing surface, and a third regime of negative blade angles which may be selected by the pilot during landing maneuvers, or when the aircraft is on a landing surface.

Further objects and advantages of the present invention will be apparent from the following description, reference being had to the accompanying drawings wherein a preferred embodiment of the present invention is clearly shown.

Figure 1:
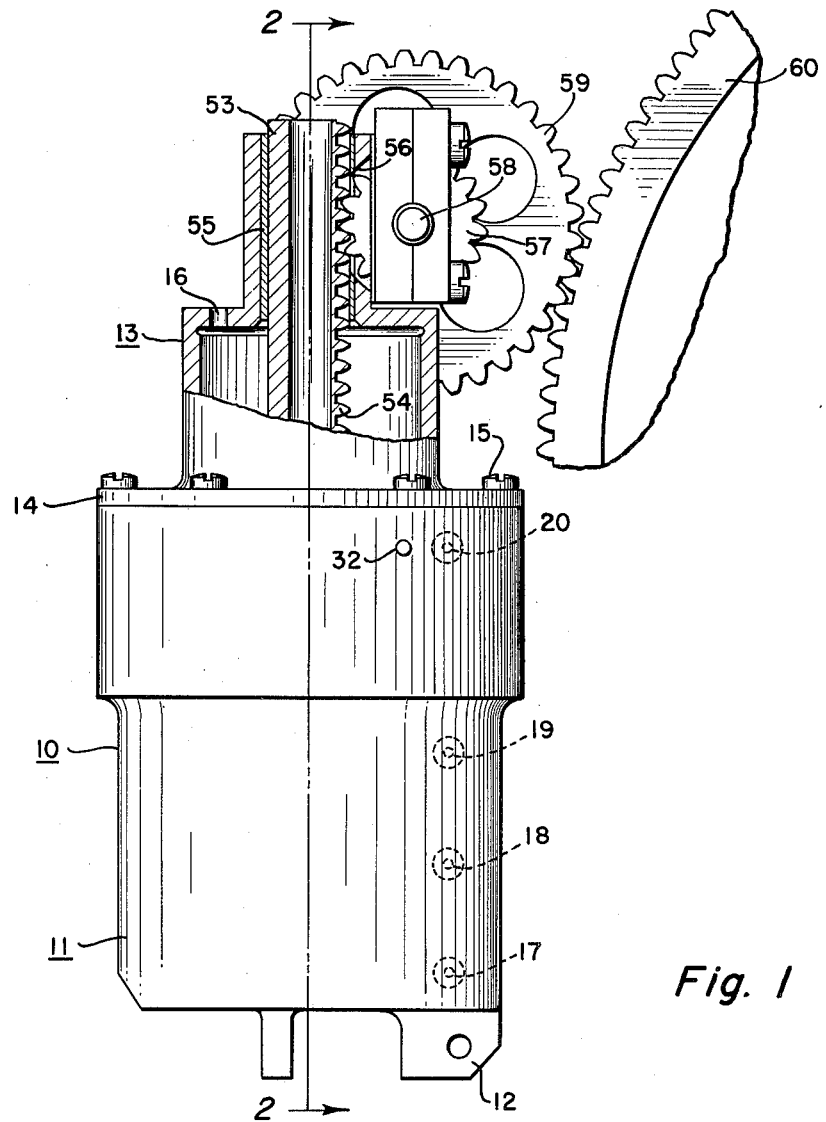
Fig. 1 is a view, partly in section and partly in elevation, of the actuator of this invention.

With particular reference to Fig. 1 of the drawings, an actuator 10 is shown comprising a cylinder 11 having an integral longitudinally extending bracket portion 12 by which the cylinder 11 may be attached to any suitable supporting structure, not shown. The cylinder 11 is also pivotally mounted to the supporting structure at 32, in order to take the backlash out of gears 59 and 60, to be described. One end wall of the cylinder 11 is formed by a guide assembly 13 comprising a generally cup-shaped member having an annular flange portion 14, which is rigidly attached to the cylinder walls and has sealing engagement therewith, the guide assembly being attached thereto by any suitable means, such as bolts 15, as shown. As shown in Fig. 1, the cup-shaped portion of the guide assembly 13 is provided with a port opening 16 through which any fluid that seeps by a portion of a piston head received within the guide assembly, may flow to drain.

Figure 2:
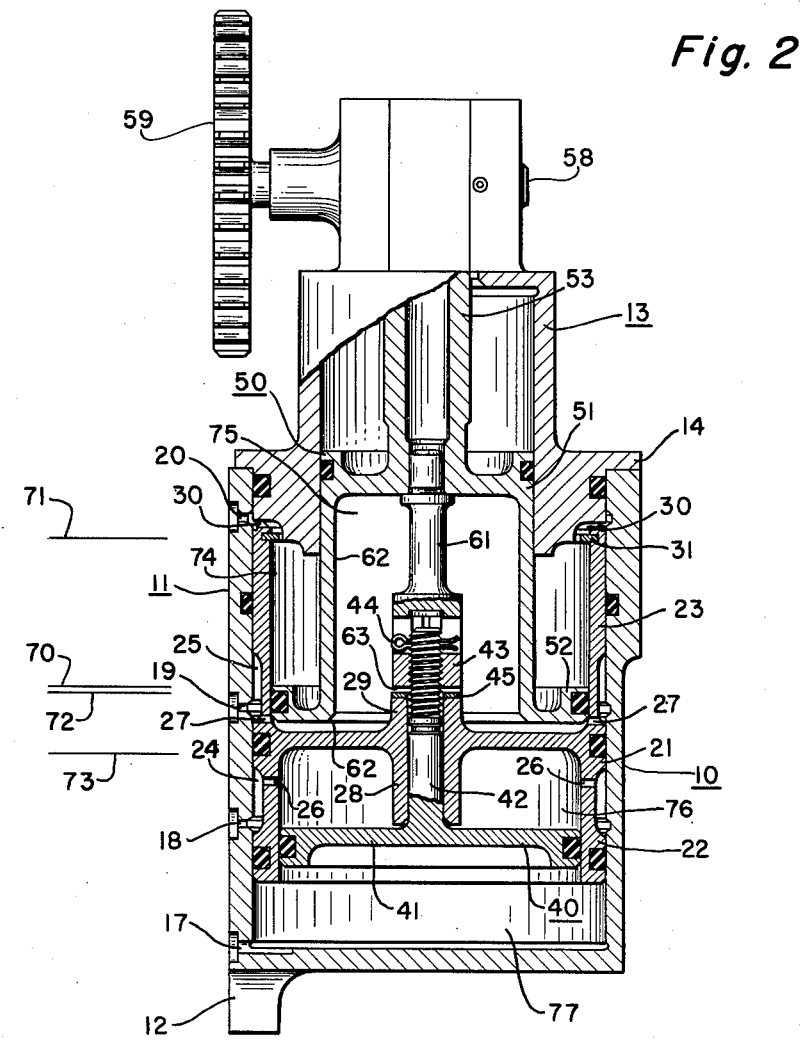
Fig. 2 is a view, partly in section and partly in elevation, taken along line 2—2 of Fig. 1.

Referring more particularly to Fig. 2, the cylinder 11 has four longitudinally spaced port openings 17, 18, 19 and 20. A sleeve piston 21 is disposed within the cylinder 11 for reciprocable movement. The piston 21 includes oppositely extending sleeve portions 22 and 23, which are sealingly received by the cylinder walls. As is shown, the sleeve portion 22 is formed with an annular channel 24 that is always in communication with port opening 18. In addition, the sleeve portion 22 is formed with a pair of diametrically opposed openings 26 through which fluid may flow from port 18 in channel 24 to the interior of sleeve portion 22. The sleeve portion 23 is, likewise, formed with an annular channel 25 that is always in communication with port opening 19. In a like manner, the sleeve portion 23 has a pair of diametrically opposed openings 27, which connect the annular channel 25 with the interior of sleeve portion 23. The head portion of sleeve piston 21 includes oppositely extending hollow rod portions, or annular flanges 28 and 29, which are concentrically disposed with regard to the sleeve portions 22 and 23 and the walls of cylinder 11. In addition, the sleeve portion 23 is formed with a pair of diametrically opposed notches 30 adjacent the free end thereof, which notches serve to connect the interior of sleeve portion 23 with port opening 20 of the cylinder. The end of sleeve portion 23 having the notches 30 is also provided with an internal groove, which is adapted to receive a snap ring 31. Sleeve piston 21 is shown abutting the guide assembly 13, which represents one end position of the sleeve piston. The sleeve piston 21 may be moved mechanically and under the urge of fluid pressure downwardly, as viewed in Fig. 2, to where the sleeve portion 22 will abut the integral end wall of the cylinder 11. However, it is to be noted that regardless of the position of the sleeve piston 21 relative to the cylinder 11, the annular channels 24 and 25 will always be in communication with the ports 18 and 19.

A second reciprocable piston 40 has a head portion 41 sealingly received within the sleeve portion 22. The piston 40 includes a longitudinally extending rod portion 42, which extends through the centrally apertured rod portions 28 and 29 of the piston 21, and is sealingly received therein. As is seen in Fig. 2, the end portion of rod 42 is threaded and receives a stop nut 43, the position of which may be adjusted relative to the piston head 41 and after the adjustment is made, the nut 43 is fixedly retained in position by means of a cotter pin 44, the ends of which are received in a diametrically slotted portion of the nut 43. A washer 45, which encompasses the rod portion 42 of the piston 40, is disposed between the rod portion 29 of the piston 21 and the nut 43, which washer also forms part of the means for adjusting the maximum distance between the end of rod portion 29 and the nut 43.

A working piston 50 having a cup-shaped head portion 51, the rim 52, of which is sealingly received by the sleeve portion 23, is mounted for reciprocable movement within the cylinder 11. The body of the cup-shaped portion of the piston head 51 is sealingly received by the cup-shaped portion of the guide assembly 13. The working piston 50 includes a longitudinally extending hollow rod portion 53, which projects through the open end of guide assembly 13, and, as is shown in Fig. 1, has formed thereon a toothed rack surface 54. The end of rod portion 51 is received by a plain bearing 55 having an opening 56 therethrough through which the teeth of a pinion gear 57 project, the pinion having operative engagement with the rack 54. The pinion gear 57 is rotatably attached to a bearing mounted shaft 58, to which a second pinion gear 59 is also rotatably attached. Pinion gear 59, in turn, meshes with a toothed load member 60, which is rotatably supported by any suitable means, not shown. Although the present invention is particularly adapted for use with variable pitch propeller mechanism, it is to be understood that it is capable of other adaptations. However, when the actuator is employed in variable pitch propeller mechanisms, the load member 60 is operatively connected to valve mechanisms in the servo system for controlling the operation of propeller blade shifting servo-motors.

The working piston 50 is centrally apertured, and a stop member 61 is rigidly retained within the apertured head portion 51 by any suitable means. The stop member 61 extends longitudinally within the cup-shaped piston head 51 and is disposed for engagement with the end of nut 43, to thereby limit movement of the piston 50 downwardly, as viewed in Fig. 2. It will be observed that the working piston 50 has head portions of unequal area, by virtue of its cup-shaped configuration. It is readily apparent that surface 62 of head portion 51 is of appreciably greater area than the head surface of rim 52. With pistons 21 and 40 in the positions shown in Fig. 2, the working piston 50 may move in the range between lines 70 and 71 in Fig. 2. The piston 50 cannot move downwardly further than line 70 inasmuch as the stop member 61 abuts the end of nut 43. However, if the piston 40 is moved downwardly so that surface 63 of the nut 43 engages the washer 45, the piston 50 may move between limits defined by lines 71 and 72 of Fig. 2. In addition, if the sleeve piston is moved into engagement with the integral end wall of the cylinder 11 and the piston 40 is moved therewith, the piston 50 may move in the range defined between lines 71 and 73. Thus, with the actuator construction disclosed, the pistons 20 and 21 may be adjusted to establish three distinct ranges of movement for the working piston 50.

When the actuator of this invention is used in conjunction with variable pitch propeller mechanisms, the range of movement between lines 70 and 71 is indicative of a blade angle position in the positive thrust regime while the aircraft is in flight. The range of movement of piston 50 between lines 71 and 72 represents the positive thrust regime of blade angle when the aircraft is on a landing surface, and the range of piston movement between lines 71 and 73 is indicative of the complete range of blade angle movement including the positive and negative thrust regimes.

The actuator disclosed herein is particularly adapted for use in conjunction with a propeller mechanism of the type disclosed in copending application, Serial No. 269,672, filed February 2, 1952, in the name of Miller, et al., wherein a dual low pitch stop valve assembly is employed to control the lowest positive blade angle obtainable during constant speed propeller operation while the aircraft is in flight, and while the aircraft is on a landing surface. When the actuator of this invention is used in conjunction with the dual low pitch stop valve assembly of the aforementioned application, a predetermined pressure potential is always maintained in actuator chamber 74.

Figure 3:
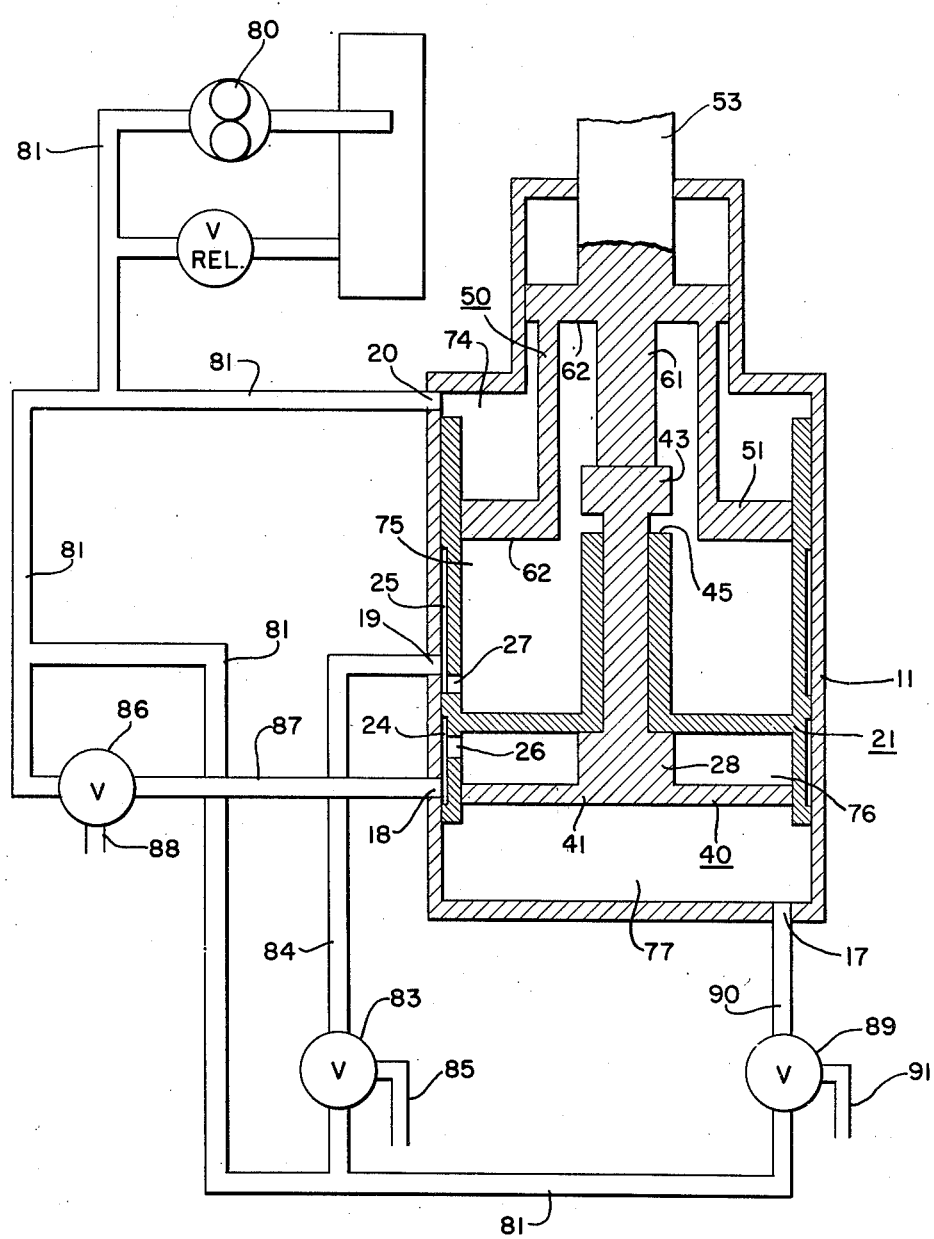
Fig. 3 is a schematic diagram of a fluid pressure system for operating the present actuator.

With reference to Fig. 3, chamber 74 is connected to a source of fluid pressure 80 through conduit 81 and port 20. Inasmuch as the area of piston head 51, exposed to the chamber 74, is appreciably less than the surface area 62 of the piston head exposed to chamber 75, it is apparent that the position of the working piston 50 may be controlled by the application of, or the removal of, pressure fluid of the same predetermined pressure potential from the chamber 75 through openings 27, the channel 25 and port 19, as controlled by valve 83 in conduit 84. When port 19 is connected to drain through drain port 85 of valve 83, pressure fluid in chamber 74 will move the piston 50 to the position shown in Fig. 2. Conversely, when port 19 is connected to the pressure source 80 by valve 83 and the pressure fluid in chamber 75 attains a potential equal to the potential of pressure fluid in chamber 74, the piston 50 will move upwardly to a position where the rim portion 52 engages the snap ring 31, which is the position indicated by line 71, Fig. 2. Port 18 is connected with the dual low pitch stop valve assembly, schematically indicated by valve 86 in conduit 87, and when the aircraft is in flight under constant speed operation, the port 18, and, hence, chamber 76 are connected to drain through port 88 of the valve 86. Port 17 and, hence, chamber 77 are connected to a selector valve assembly, schematically shown as valve 89 in conduit 90, which is manually operable by the pilot when operation in the negative thrust regime is selected. When the propeller mechanism is operated under constant speed control, the port 17 and the chamber 77 are connected to the same pressure potential, which is supplied to the chamber 74 by valve 89. Accordingly, inasmuch as the chamber 76 is connected to drain, by valve 86, pressure fluid in chamber 77 will urge the piston 40 into engagement with the end of rod portion 28, as shown in Fig. 2. In this manner when the aircraft is in flight and operated in the constant speed regime, the piston 50 can only move within the limits determined by lines 70 and 71.

In accordance with the teachings of the aforementioned copending application, when the piston 50 is in the position of line 70, as shown in Fig. 2, the blades of the propeller, not shown, are at the flight low pitch stop angle, which is the lowest safe blade angle for propeller blades when the aircraft is air-borne. However, when the aircraft is on the landing surface, it is sometimes desirable to reduce the blade angle below the flight low pitch stop to a ground low pitch stop, as indicated by line 72. In order to move the piston 40 downwardly so that surface 63 of the nut 43 abuts the washer 45, it is first necessary, in accordance with the teachings of the aforementioned copending application, to move the blades into the negative thrust regime, that is, move the piston 50 to a position between the lines 72 and 73. This may be accomplished by connecting port 17 and chamber 77 to drain through port 91 of valve 89, while ports 18 and 19 are connected to drain through valves 83 and 86, so that pressure fluid in chamber 74 can move the piston 50 downwardly, mechanically move the piston 40 downwardly, and hydraulically move the sleeve piston 21 downwardly. Thereafter, ports 17 and 18 are connected to the same pressure potential, by valves 86 and 89, so as to move pistons 21 and 40 upwardly as viewed in Fig. 2. Inasmuch as the rod and portion of the piston head 41 is of smaller area than the other side thereof, the nut 43 will not be moved into engagement with the washer 45 until port 19 is connected to drain by valve 83 and piston 50 moves under the urge of pressure fluid in chamber 74 and mechanically assists the pressure fluid in chamber 76 in moving the piston 40 downwardly to a position where nut 43 engages washer 45.

In operation with port 17 connected to the same pressure potential as port 20, and port 18 connected to drain, the stroke of piston 50 is defined by lines 70 and 71. Piston 50 may assume any position between the lines 70 and 71 depending upon the potential of pressure fluid in chamber 75. However, inasmuch as the pressure potential of fluid in chamber 77 is always equal to, or greater than, the pressure potential in chamber 75, the piston 21 will be maintained in the position shown in Fig. 2.

When the piston 40 is moved downwardly, in the manner aforedescribed, so that nut 43 engages washer 45, the stroke of piston 50 is increased by the linear distance between lines 70 and 72. When port 17 is connected to drain and port 18 is connected to the source of pressure fluid, depicted by pump 80 in Fig. 3, the pistons 40 and 21 will move downwardly until piston 21 engages the integral end wall of cylinder 11 and the piston 40 will assume a position where nut 43 engages washer 45. When the several pistons are in this position, the stroke of piston 50 is increased to the linear distance between lines 71 and 73.

From the foregoing it is apparent that the present invention provides an actuator in which the stroke of the working piston may be readily adjusted to any one of three ranges. Moreover, the limit of the stroke of the working piston is physically fixed in one direction whereas the limit of movement in the opposite direction may be adjusted to any one of three positions.

While the embodiment of the present invention as herein disclosed, constitutes a preferred form, it is to be understood that other forms might be adopted.

What is claimed is as follows:

1. A fluid pressure operated actuator including in combination, a cylinder, a first reciprocable piston having a head disposed in said cylinder capable of mechanical actuation in either direction, said first piston having sleeve portions extending in opposite directions from the head in sealing engagement with the cylinder walls, a second reciprocable piston mounted for movement within one of said sleeve portions, said second piston having a longitudinally extending rod portion which projects through an opening in the head of said first piston, and a reciprocable working piston mounted for movement within the other sleeve portion and capable of fluid pressure actuation in either direction, said working piston including means engageable with the rod portion of said second piston, the construction and arrangement being such that the stroke of said working piston is determined by the position of the second piston.

2. A fluid pressure operated actuator including in combination, a cylinder, a sleeve piston within said cylinder having a head portion dividing said cylinder into two chambers and a pair of sleeve portions extending in opposite directions, a reciprocable working piston disposed in one of said chambers capable of fluid pressure actuation in either direction and sealingly engaging one of said sleeve portions, and a stop piston disposed in the other of said chambers and sealingly engaging the other of said sleeve portions including means extending through said sleeve piston and engageable with the working piston for limiting movement thereof in one direction.

3. The combination set forth in claim 2 wherein the stop piston is capable of fluid pressure actuation in one direction and mechanical actuation in the other direction, and wherein the means extending through said sleeve piston are constituted by a longitudinally extending rod portion of said stop piston.

4. The combination set forth in claim 3 wherein the head portion of said sleeve piston includes a hollow rod portion extending in opposite directions, within which the longitudinally extending rod portion of the stop piston is sealingly received.

5. The combination set forth in claim 2 wherein said working piston includes a cup-shaped head portion having surfaces of unequal area on opposite sides thereof, the bottom of said cup-shaped portion having attached thereto a stop member which projects longitudinally toward the open end of said cup-shaped head portion and is engageable with the longitudinally projecting means of the stop piston.

6. A fluid pressure operated actuator including in combination, a cylinder, a reciprocable sleeve piston disposed within said cylinder including a head portion which divides the cylinder into two chambers and a pair of oppositely extending sleeve portions, a reciprocable working piston disposed in one of said chambers capable of fluid pressure actuation in either direction and sealingly engaging one of said sleeve portions, a reciprocable stop piston disposed within the other chamber and sealingly engaging the other of said sleeve portions, and means carried by the stop piston and operatively engageable by the working piston for varying the length of the stroke of said working piston in one direction.

7. A fluid pressure operated actuator including in combination, a cylinder, a reciprocable sleeve piston disposed in said cylinder having a head portion which divides said cylinder into two chambers and a pair of oppositely extending sleeve portions disposed in said chambers, a reciprocable working piston disposed in one of said chambers capable of fluid pressure actuation in both directions and sealingly engaging one of said sleeve portions, a reciprocable stop piston disposed within the other chamber and sealingly engaging the other of said sleeve portions, said stop piston including a longitudinally extending rod portion which projects through an opening in the head of said sleeve piston, and a rod attached to and movable with said working piston and arranged to engage the rod of said stop piston for limiting the stroke of said working piston in one direction.

8. A fluid pressure operated actuator including in combination, a cylinder, a reciprocable sleeve piston disposed in said cylinder having a head portion which divides said cylinder into two chambers and a pair of oppositely extending sleeve portions disposed in said chambers, a reciprocable working piston disposed in one of said chambers capable of fluid pressure actuation in both directions and sealingly engaging one of said sleeve portions, a reciprocable stop piston disposed within the other chamber and sealingly engaging the other of said sleeve portions, said stop piston having a longitudinally extending rod that projects through an opening in the head of said sleeve piston, said rod having a threaded portion, a nut threadedly engaging the threaded portion of said rod whereby said nut may be adjusted axially relative to said rod, and means for retaining said nut in adjusted position, said working piston including means engageable with said nut for limiting the stroke thereof in one direction.

9. A fluid pressure operated actuator including in combination, a cylinder, a reciprocable sleeve piston disposed in said cylinder having a head portion which divides said cylinder into two chambers and a pair of oppositely extending sleeve portions disposed in said chambers, a reciprocable working piston disposed in one of said chambers capable of fluid pressure actuation in both directions and sealingly engaging one of said sleeve portions, a reciprocable stop piston disposed within the other chamber and sealingly engaging the other of said sleeve portions, the head portion of said sleeve piston including a hollow rod portion extending in opposite directions, said stop piston including a longitudinally extending rod portion that is sealingly received within said hollow rod portion of the sleeve piston and movable relative thereto, adjustable means attached to said rod portion of said stop piston for limiting relative movement between said stop piston and said sleeve piston, and means interposed between one surface of said hollow rod and said adjustable means for limiting relative movement between said stop piston and said sleeve piston, said working piston including means engageable with the adjustable means of the rod portion of said stop piston for limiting the stroke of said working piston in one direction.

References Cited in the file of this patent
UNITED STATES PATENTS

| | | |
|---|---|---|
| 2,005,387 | Pelton | June 18, 1935 |
| 2,234,009 | Robinson | Mar. 4, 1941 |
| 2,484,603 | Audemar et al. | Oct. 11, 1949 |
| 2,648,312 | Tucker | Aug. 11, 1953 |